United States Patent [19]

Yamada

[11] 4,236,789

[45] Dec. 2, 1980

[54] PROJECTION OPTICAL SYSTEM

[75] Inventor: Yu Yamada, Kokubunji, Japan

[73] Assignee: Canon Kabushiki Kaisha, Tokyo, Japan

[21] Appl. No.: 823,428

[22] Filed: Aug. 10, 1977

[30] Foreign Application Priority Data

Aug. 12, 1976 [JP] Japan .................... 51-96558

[51] Int. Cl.² ............................................. G02B 15/04
[52] U.S. Cl. ..................................... 350/183; 350/216
[58] Field of Search ............... 350/215, 216, 183, 254; 353/39, 102

[56] References Cited

U.S. PATENT DOCUMENTS

| | | | |
|---|---|---|---|
| 1,996,054 | 4/1935 | Rowen | 350/216 X |
| 3,588,226 | 6/1971 | Ikezu | 350/183 |
| 3,955,883 | 5/1976 | Sugiyama | 350/215 |

FOREIGN PATENT DOCUMENTS 931063  7/1963  United Kingdom ............. 350/216

*Primary Examiner*—Paul A. Sacher
*Attorney, Agent, or Firm*—Toren, McGeady and Stanger

[57] ABSTRACT

An optical system projects information recorded onto a record carrier on a projection plane. In the system a plurality of projecting lenses include a long focal length lens group composed of five lenses. As viewed from the projection plane there are two positive meniscus lenses (I and II) having their convex faces facing the projection plane, a concavo-concave lens (III), a convexo-convex lens (IV) and a negative meniscus lens having its convex face facing the record carrier.

6 Claims, 3 Drawing Figures

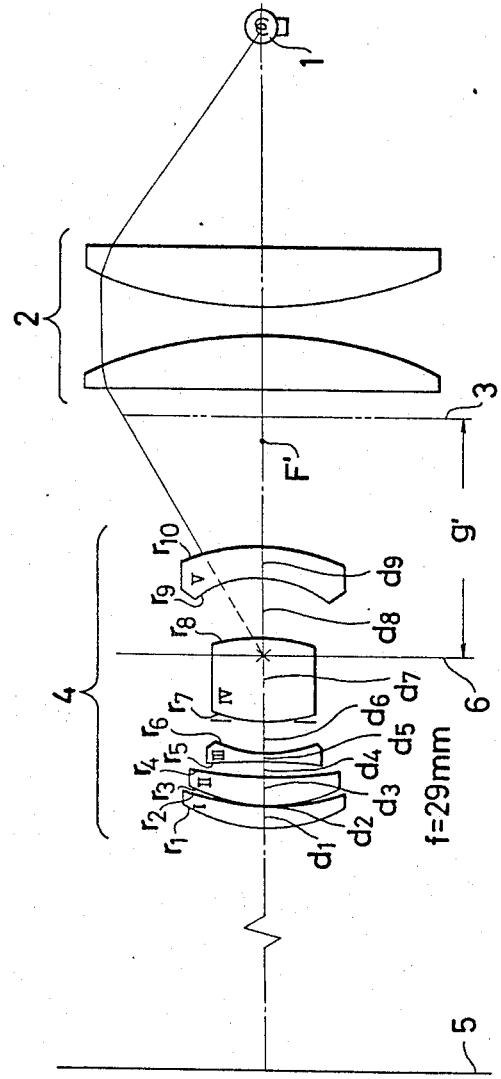

Spherical Aberration

Curvature of Field

Distortion Aberration

Spherical Aberration

Curvature of Field

Distortion Aberration

PROJECTION OPTICAL SYSTEM

BACKGROUND OF THE INVENTION

This invention relates to a projection optical system having a magnification power varying device and more particularly to an optical system which illuminates a data record carrier, such as film or the like, and project the recorded information through lens systems of different magnifications, and which is particularly suitable for application to a micro-film reader/printer.

Generally, a projection optical system employed in a micro-film reader/printer is composed of a light source such as a lamp; a condenser lens which condenses light flux coming from the lamp and directs it toward the micro-film; and projecting lenses which project the light flux passing through the micro-film onto a screen or a photosensitive paper surface to form a magnified image thereon. In such an optical system, a so-called Koehler illumination method is employed to form an image of the lamp coming through the condenser lens systems approximately at a pupil point on the film end of the projecting lens. However, if the distance between the pupil point of the projecting lens and the film surface varies with each projecting lens employed, either the illumination area on the projection plane, e.g. the screen or the photosensitive surface, tends to become insufficient or the illumination on the projection plane tends to become uneven. To avoid this problem, the image of the lamp must be adjusted closer to the pupil point either by shifting the position of the lamp or by replacing or shifting a part or all of the condenser lens.

Let us assume that both a short focal length lens to be employed as projecting lens and a long focal length lens also to be employed as projecting lens are ordinary Gauss type lenses and that they are compared with respect to a distance g' between the pupil point on the film end of the projecting lens and the film surface. When the short focal length lens is of 13 mm and is used at 50 magnifications while the long focal length lens is of 29 mm and is used at 22 magnifications, the difference between them in the distance g' becomes about 19 mm. This necessitates adjustment of the condenser lens part as mentioned.

To solve this problem, methods have been proposed for maintaining the distance g' between the pupil point on the film surface end of each lens system and the film surface unvaried even where lens systems of varying focal lengths are employed. This appears in U.S. Pat. No. 3,588,226. In an example of such methods, the above stated distance g' is made longer by using an ordinary Gauss type lens as a long focal length lens and a retro-focus type lens as a short focal length lens. Hence the values of the distance g' of the two is made closer to each other. However, this method still requires extremely high manufacturing precision.

According to another example, the distance g' is shortened by using a rear diaphragm Gauss type lens as a long focal length lens while an ordinary Gauss type lens is used as a short focal length lens. However, the use of a rear diaphragm type lens ruins the symmetry of the lens group relative to the diaphragm. Then, as a result, it becomes difficult to correct comatic aberration and astigmatism. Furthermore, with such a method, the diameter of the lens facing the projection plane (a screen, a photosensitive surface, or the like) is inevitably increased to a considerable degree.

SUMMARY OF THE INVENTION

It is an object of this invention to provide a projection optical system of the above mentioned type comprising component parts arranged in sequence, from a light source, a condenser lens, a record carrier, a projecting lens composed of a plurality of projecting lenses and a projection surface, the information recorded on the record carrier being arranged to be projectable on the projection surface at variable magnifications by replacing these projecting lenses with other lenses of different focal lengths, and the system being characterized in that the distance between the surface of the record carrier and the pupil point of the projection lens on the record carrier end can be kept almost unvaried even when the projecting lenses are replaced with projecting lenses of different focal lengths.

Another object of this invention is to provide a projection optical system wherein illumination light from a condenser lens system is always imaged approximately at the pupil point of a projecting lens on the record carrier end without necessitating adjustment of a condenser lens system for the use of projecting lenses of different focal lengths.

A further object of this invention is to provide a projection optical system wherein the aberrations of the projection lens are satisfactorily corrected.

In accordance with this invention, when lenses in the projecting lens are replaced, the distance between the record carrier and the pupil point in the record carrier end of projecting lens is kept almost unvaried by bringing the pupil point on the record carrier end of the long focal length projecting lens closer to the pupil point of the short focal length projecting lens. The invented projection optical system employs, as a long focal length projecting lens, a group of five lenses arranged, as viewed from a projection plane (such as a screen or a photo-sensitive surface), two positive meniscus lenses which have their convex faces directed to the projection plane, a concavo-concave lens, a convexo-convex lens and a negative meniscus lens having its convex face directed to a record carrier. With such a telephoto type lens arrangement employed as a long focal length projecting lens, the distance between the record carrier and the above stated pupil point can be made shorter than that of the conventional Gauss type long focal length lenses.

These and other objects, advantages, features and uses will become more apparent from the following description taken in connection with the accompanying drawings.

BRIEF DESCRIPTION OF THE DRAWINGS:

FIG. 1 is a side view schematically illustrating an embodiment of the projection optical system of this invention.

Figure 2A:
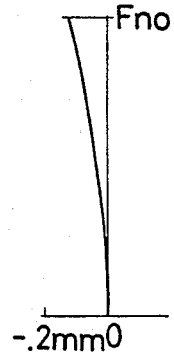
FIGS. 2a, 2b, 2c and 3a, 3b, 3c, are illustrations of aberrations of projecting lenses employed in the embodiment examples of this invention.

DESCRIPTION OF THE PREFERRED EMBODIMENT:

Referring to FIG. 1 which is a side view schematically illustrating an embodiment of this invention, a reference character 1 indicates a light source such as a lamp; 2 indicates a condenser lens assembly; 3 indicates a micro-film as record carrier; 4 indicates a group of projecting lenses; and 5 indicates a projection surface such as a screen or a photosensitive surface or the like.

Light flux from the light source 1 is condensed by the condenser lens assembly 2 and, after passing through the film 3, is imaged in the vicinity of a pupil point 6 of the film end of the projecting lens. The light flux which has passed through the projecting lens assembly 4 converges on the projection surface 5. The configuration of the projecting lens assembly 4 as illustrated in FIG. 1 involves a long focal length lens arrangement embodying this invention. It includes a group of five lenses including, as viewed from the projection surface 5, two positive meniscus lenses I and II having their convex faces directed to the projection surface 5, concavo-concave lens III, a convexo-convex lens IV and a negative meniscus lens V having its convex surface facing the record carrier 3. Lenses of various focal lengths determined according to a desired magnification are arranged in the position of the projecting lens assembly 4. Therefore, the projection optical system includes a plurality of projection lenses or assemblies.

As compared with the conventional lenses of the long focal length Gauss type, the distance g' between the film 3 and the pupil point 6 of the long focal length projecting lens assembly 4 shown in FIG. 1 is short. In other words, the lens system is constructed so that the pupil point 6 of the projecting lens assembly 4 toward the film 3 is located closer to the film. Then, in accordance with this invention, the degradation of the projecting lens assembly 4 in terms of aberrations is prevented by arranging the projecting lens assembly 4 to satisfy the following four conditions:

(1) $-3.70f < r5 < -1.00f$
(2) $0.13f < d7 < 0.35f$
(3) $-1.15f < f5 < -0.67f$ and
(4) $0.03 < BF < 0.37$ Here, f represents the focal length of the whole projecting lens assembly 4; r5 represents the radius of curvature of the concavo-concave lens III facing the projection surface; d7 represents the thickness along the axis of the convexo-convex lens IV; f5 represents the focal length of the negative meniscus lens V; and BF the back focal distance of the projecting lens assembly 4 toward the film 3. The details of the four conditions are as described below:

Condition (1): This condition relates to the radius of the curvature of the lens surface of the concavo-concave lens III facing the projection surface. If the radius of the curvature is less than a lower limit value, astigmatic difference becomes excessively great; and if it exceeds an upper limit value, the negative distortion aberration which has occured on this surface decreases thereby causing the overall bobbin-like distortion aberration to increase to an excessive degree.

Condition (2): Places a restriction on the thickness of the convexo-convex lens IV. When the thickness is below a lower limit value, the curvature of field increases and degradation takes place in comatic and distortion aberrations. On the other hand, when it exceeds an uppwer limit value, spherical aberration at a high angle of view becomes overcorrected.

Condition (3): To restrict the focal length of the negative meniscus lens V. This condition must be satisfied to ensure that the distance between the pupil point on the film side of the projecting lens assembly and the film is adequate as aimed by this invention. If the focal length of the lens V is below a lower limit value and its refracting power is weakened, the distance between the pupil point and the film becomes excessively long. If the focal length of the lens V exceeds an upper limit value and its negative refracting power becomes excessively strong, the spherical aberration of its sagittal surface becomes overcorrected.

Condition (4): The distance between the film and the pupil point in the direction of the film is made appropriate to the back focal distance of the projecting lens assembly 4 set within this range.

Figure 2B:
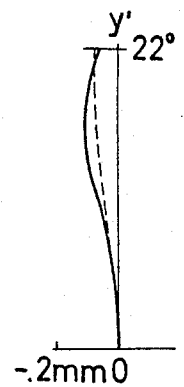
Figure 2C:
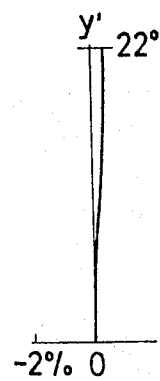
Figure 3A:
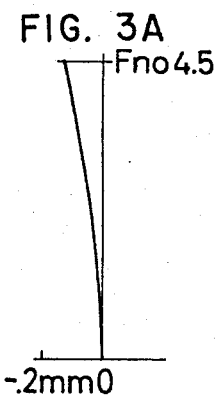
Figure 3B:
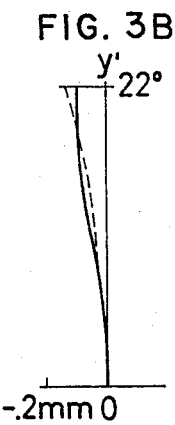
Figure 3C:
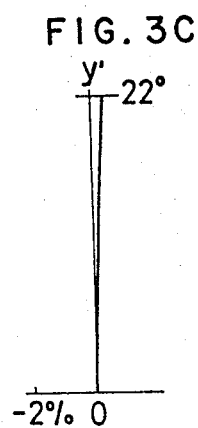

The following description covers six examples of the projecting lens assembly that correspond to FIG. 1. In these examples, the composite focal length of the whole system is standardized at f=1. FIGS. 2a, 2b, 2c illustrates the spherical aberration, curvature of field and distortion aberration of Example 1 and FIGS. 3a, 3b, 3c the aberrations of Example 2 given below:

EXAMPLE 1

|    | r        | d      | nd      | νd   |
|----|----------|--------|---------|------|
| 1  | 0.43224  | 0.0622 | 1.69680 | 55.5 |
| 2  | 0.72206  | 0.0035 |         |      |
| 3  | 0.50632  | 0.0859 | 1.69680 | 55.5 |
| 4  | 1.4741   | 0.0419 |         |      |
| 5  | −1.8621  | 0.0262 | 1.72825 | 28.5 |
| 6  | 0.44258  | 0.0933 |         |      |
| 7  | 0.73603  | 0.2378 | 1.78590 | 44.1 |
| 8  | −0.84706 | 0.1778 |         |      |
| 9  | −0.31996 | 0.0831 | 1.58144 | 40.7 |
| 10 | −0.82216 |        |         |      |

The diaphragm is located 0.0933 from face r5 on the film side.

$-3.70 < r5 = -1.8621 < -1.00$ $0.13 < d7 = 0.2378 < 0.35$ $-1.15 < f5 = -0.9593 < -0.67$ $BF = 0.3338 < 0.4$

EXAMPLE 2

|    | r        | d      | n       | ν    |
|----|----------|--------|---------|------|
| 1  | 0.40846  | 0.0642 | 1.69350 | 55.3 |
| 2  | 0.66022  | 0.0035 |         |      |
| 3  | 0.50296  | 0.0788 | 1.69350 | 53.3 |
| 4  | 1.2858   | 0.0283 |         |      |
| 5  | −2.2210  | 0.0263 | 1.72825 | 28.5 |
| 6  | 0.44114  | 0.0813 |         |      |
| 7  | 0.62789  | 0.3160 | 1.78590 | 44.1 |
| 8  | −0.85695 | 0.1450 |         |      |
| 9  | −0.29869 | 0.0762 | 1.59551 | 39.2 |
| 10 | −0.89208 |        |         |      |

The diaphragm is located 0.0710 from face r5 on the film side.

$-3.70 < r5 = -2.221 < -1.00$ $0.13 < d7 = 0.316 < 0.35$ $-1.15 < f5 = -0.792 < -0.67$ $BF = 0.3445 < 0.4$

EXAMPLE 3

|   | r       | d      | n       | ν    |
|---|---------|--------|---------|------|
| 1 | 0.36584 | 0.0598 | 1.77250 | 49.7 |

-continued

| | r | d | n | ν |
|---|---|---|---|---|
| 2 | 0.59766 | 0.0035 | | |
| 3 | 0.61130 | 0.0503 | 1.77250 | 49.7 |
| 4 | 1.3722 | 0.0214 | | |
| 5 | −2.0669 | 0.0245 | 1.72825 | 28.5 |
| 6 | 0.44847 | 0.0626 | | |
| 7 | 0.55206 | 0.3317 | 1.74400 | 44.8 |
| 8 | −0.76316 | 0.1160 | | |
| 9 | −0.26395 | 0.1050 | 1.59551 | 39.2 |
| 10 | −0.81895 | | | |

The diaphragm is located 0.0626 from face r5 on the film side.

$-3.70 < r5 = -2.0669 < -1.00$ $0.13 < d7 = 0.3317 < 0.35$ $-1.15 < f5 = -0.7037 < -0.67$ $BF = 0.3684 < 0.4$

EXAMPLE 4

| | r | d | n | ν |
|---|---|---|---|---|
| 1 | 0.42652 | 0.0565 | 1.69350 | 53.3 |
| 2 | 0.87107 | 0.0035 | | |
| 3 | 0.51092 | 0.0855 | 1.69350 | 55.5 |
| 4 | 1.3032 | 0.0395 | | |
| 5 | −3.5050 | 0.0262 | 1.72825 | 28.5 |
| 6 | 0.39961 | 0.1082 | | |
| 7 | 0.76833 | 0.2643 | 1.78590 | 44.1 |
| 8 | −0.92009 | 0.1547 | | |
| 9 | −0.35113 | 0.1100 | 1.59551 | 39.2 |
| 10 | −1.0263 | | | |

The diaphragm is located 0.0971 from face r5 on the film side.

$-3.70 < r5 = -3.505 < -1.00$ $0.13 < d7 = 0.2643 < 0.35$ $-1.15 < f5 = -0.9543 < -0.67$ $BF = 0.3035 < 0.4$

EXAMPLE 5

| | r | d | n | ν |
|---|---|---|---|---|
| 1 | 0.41873 | 0.0591 | 1.69680 | 55.5 |
| 2 | 0.75217 | 0.0035 | | |
| 3 | 0.50236 | 0.0780 | 1.69680 | 55.5 |
| 4 | 1.4470 | 0.0331 | | |
| 5 | −1.7406 | 0.0261 | 1.72825 | 28.5 |
| 6 | 0.45996 | 0.1074 | | |
| 7 | 0.84393 | 0.1346 | 1.78590 | 44.1 |
| 8 | −0.94900 | 0.2363 | | |
| 9 | −0.29593 | 0.1060 | 1.58144 | 40.7 |
| 10 | −0.63249 | | | |

The diaphragm is located 0.1074 from face r5 on the film side.

$-3.70 < r5 = -1.7406 < -1.00$ $0.13 < d7 = 0.1346 < 0.35$ $-1.15 < f5 = -1.0818 < -0.67$ $BF = 0.3051 < 0.4$

EXAMPLE 6

| | r | d | n | ν |
|---|---|---|---|---|
| 1 | 0.45404 | 0.0616 | 1.69680 | 55.5 |
| 2 | 0.68852 | 0.0035 | | |
| 3 | 0.53162 | 0.0825 | 1.69680 | 55.5 |
| 4 | 2.0001 | 0.0481 | | |
| 5 | −1.0584 | 0.0261 | 1.72825 | 28.5 |
| 6 | 0.50138 | 0.0826 | | |
| 7 | 0.74910 | 0.1659 | 1.78590 | 44.1 |
| 8 | −0.77222 | 0.2580 | | |
| 9 | −0.29254 | 0.1041 | 1.58144 | 40.7 |
| 10 | −0.61182 | | | |

The diaphragm is located 0.0286 from face r5 on the film side.

$-3.70 < r5 = -1.0584 < -1.00$ $0.13 < d7 = 0.1659 < 0.35$ $-1.15 < f5 = -1.095 < -0.67$ $BF = 0.3039 < 0.4$

Further, assuming that distance between the pupil point on the film side of the projecting lens part 4 and the focal point on the film side of the projecting lens part 4 is g'∞ and the magnification by the projecting lens part 4 is β times, the distance g' between the film and the pupil point on the film side of the projecting lens part 4 is obtained from the following:

$$g' = g'_\infty + f \times \frac{1}{\beta}$$

Since, in the above, $f \times 1/\beta$ is unrelated to the type of the lens employed, the comparison in g'∞ of the above examples is as shown below:

| Examples: | 1 | 2 | 3 | 4 | 5 | 6 |
|---|---|---|---|---|---|---|
| g'∞ | 0.651 | 0.661 | 0.691 | 0.644 | 0.651 | 0.722 |

When a Gauss type lens is used as a short focal length lens at f=13 mm and 50 magnifications and the lens of Example 1 shown in the foregoing at f=29 mm and 22 magnifications, the difference in g' between the two lenses becomes 4.5 mm. This, therefore, permits the use of a condenser lens system in common with them.

What is claimed is:

1. A projection optical system comprising the following components arranged in sequence from a light source:
   a condenser lens system for causing convergence of light from the light source and then directing the light in a predetermined direction;
   a record carrier for illumination by the light from the condenser lens system; and
   a projecting lens assembly defining an optical axis and including a pair of interchangeable projecting lenses of different focal lengths interchangeably arranged on the optical axis for causing light coming through the record carrier to converge onto a projection plane;

said projection lens having a longer focal length in said lens assembly being a telephoto type lens and the projection lens having a shorter focal length being a Gauss type, said projection lenses being located and constructed so as to make the position of the pupil point of the lens having the longer focal length near the record carrier almost equal to the position of the pupil point of the lens having the shorter focal length on the record carrier;

said telephoto type lens, from the direction of the projecting plane, including two positive meniscus lenses having their convex faces directed to the projecting plane, a concavo-concave lens, a convexo-convex lens and a negative meniscus lens having its convex face directed to the record carrier.

2. A projection optical system according to claim 1, wherein said telephoto type lens satisfies the following conditions:

$-3.70f < r_5 < -1.005$
$0.13f < d_7 < 0.35f$
$-1.15f < f_5 < -0.67f$
$0.30f < BF < 0.37f$ wherein, f represents the focal length of the whole projecting lens part; $r_5$ the radius of curvature of the concavo-concave lens in the projection plane direction; $d_7$ the thickness along the axis of the convexo-concave lens; $f_5$ the focal length of the negative meniscus lens; and BF the back focal distance in the direction of the record carrier.

3. A projection optical system comprising the following components arranged in sequence from a light source:

condenser lens system for causing convergence of light coming from the light source and then directing the light in a predetermined direction;

a record carrier for illumination by the light from the condenser lens system; and a projecting lens assembly defining an optical axis and including a pair of interchangeable projecting lenses of different focal lengths interchangedably arranged on the optical axis of the optical system for causing the light through the record carrier to converge onto a projection plane, one of said projection lenses having a longer focal length in said lens assembly and one of said lenses having a shorter focal length;

said projecting lens assembly having a diaphragm said projection lens having the longer focal length having means for making the position of the pupil point thereof near the record carrier relative to the postion of the diaphragm of the lens having a longer focal length in order to make the position of the lens having a longer focal length equal to the position of the lens having a shorter focal length.

4. A projection optical system for use with a light source and a record carrier in spaced relation to said other, comprising:

a condenser lens system constructed and located for causing convergence of light from the light source and then directing the light so as to illuminate the record carrier; and a projecting lens assembly defining an optical axis and including a pair of interchangeable projecting lenses of different focal lengths interchaneably arranged on the optical axis for causing light coming through the record carrier to converge onto a projection plane;

said projection lens having a longer focal length in said lens assembly being a telephoto type lens and the projection lens having a shorter focal length being a Gauss type, said projection lenses being located and constructed so as to make the position of the pupil point of the lens having the longer focal length near the record carrier almost equal to the position of the pupil point of the lens having the shorter focal length on the record carrier;

said telephoto type lenses, from the direction of the projecting plane, including two positive meniscus lenses having their convex faces directed to the projecting plane, a concavo-concave lens, a convexo-convex lens and a negative meniscus lens having its convex face directed to the record carrier.

5. A projection optical system as in claim 4, wherein said telephoto type lens satisfies the following conditions:

$-3.70f < r_5 < -1.006$
$0.13f < d_7 < 0.35f$
$-1.15f < f_5 < -0.67f$
$0.30f < BV < 0.37f$ wherein, f represents the focal length of the whole projecting lens part; $r_5$ the radius of curvature of the concavo-concave lens in the projection plane direction; $d_7$ the thickness along the axis of the convexo-concave lens; $f_5$ the focal length of the negative meniscus lens; and BF the back focal distance in the direction of the record carrier.

6. A projection optical system for use with a light source and a record carrier, comprising:

a condenser lens system constructed and located for causing convergence of light from the light source and directing the light so as to illuminate the record carrier; and a projecting lens assembly defining an optical axis and including a pair of interchangeable projecting lenses of different focal lengths interchangeably arranged on the optical axis of the optical system for causing the light through the record carrier to converge onto a projection plane, one of said projection lenses having a longer focal length in said lens assembly and one of said lenses having a shorter focal length;

said projecting lens assembly having a diaphragm said projection lens having the longer focal length havong lens means for making the position of the pupil point thereof near the record carrier relative to the position of the diaphragm of the lens having a longer focal length in oder to make the position of the lens having a longer focal length equal to the position of the lens having a shorter focal length.

* * * * *